United States Patent [19]

Tanimizu

[11] Patent Number: 5,216,575
[45] Date of Patent: Jun. 1, 1993

[54] POWER BOARD

[75] Inventor: Toru Tanimizu, Hitachi, Japan

[73] Assignee: Hitachi, Ltd., Tokyo, Japan

[21] Appl. No.: 710,111

[22] Filed: Jun. 4, 1991

[30] Foreign Application Priority Data

Jun. 6, 1990 [JP] Japan .................................. 2-146275

[51] Int. Cl.⁵ .............................................. H02B 1/20
[52] U.S. Cl. .................................... 361/341; 361/334; 361/355; 361/390
[58] Field of Search .................... 361/331, 333-336, 361/341-342, 346-347, 350, 355-357, 379, 361, 384, 390, 391

[56] References Cited

U.S. PATENT DOCUMENTS

| 2,345,033 | 3/1944 | Claybourn | 361/341 |
| 2,539,184 | 1/1951 | Claybourn | 361/334 |
| 2,558,074 | 6/1951 | Claybourn et al. | 361/334 |
| 3,364,394 | 1/1968 | Metz | 361/341 |
| 4,118,755 | 10/1978 | Davies et al. | 361/379 |
| 4,504,885 | 3/1985 | Yoshikawa et al. | 361/342 |
| 4,685,303 | 8/1987 | Branc et al. | 361/384 |
| 4,873,601 | 10/1989 | Wakasa | 361/64 |

FOREIGN PATENT DOCUMENTS 100006 8/1981 Japan .

Primary Examiner—Gregory D. Thompson
Attorney, Agent, or Firm—Antonelli, Terry, Stout & Kraus

[57] ABSTRACT

In a power board, network transformers are disposed horizontally to reduce their height, network buses are disposed above the network transformers and a protector breaker and take-off breakers are disposed at the front of the power board in electric chambers and connected to the network buses. This arrangement places the two types of breakers and the electric chambers within the range of height accessible by an operators hand to permit him to manually handle these breakers, thereby improving ease of handling of the power board.

6 Claims, 6 Drawing Sheets

POWER BOARD

BACKGROUND OF THE INVENTION

1. Field of the Invention

The present invention relates to a power board which is improved in the arrangement of its network receiving and transformer equipment.

2. Description of the Prior Art

In cities, vertical utilization of the land has been predominant and loftiness of buildings has been encouraged. A many-storied building has a distribution of power on load which is increased vertically and a very large load capacity, and because of many important public tenants or equipments accommodated in the building, it strongly requires reliability and safety of the power supply. Further, this type of building is located in a congested area of the city and therefore its installation area is desired to be as small as possible. Since in such a building or in a plant the load is concentrated to one location, a network receiving system is the most suitable because of its high reliability of supply of power.

In the network receiving system for receiving power from a power supply substation through 22 kV or 33 kV distribution lines of two to four circuits, only receiving breakers are disposed on the primary side of network transformers, fuses and protector breakers are provided on the secondary side in association with individual network transformers, the fuses and protector breakers are connected, on their load side, in parallel by network buses, and power is supplied to a variety of loads through distribution lines connected to the network buses. One may refer to U.S. Pat. No. 4,873,601 describing a spot network receiving system.

In the event that a short circuit occurs in the network system, for example, at the primary or secondary side of the network transformer, a faulty circuit can be disconnected and power can be supplied through a sound circuit to prevent the load from suffering from power failure, thus ensuring high reliability of supply of power. This meets the customer's needs and recently the demand for the network receiving system has been increased.

In the network receiving system, the network transformer, protector breaker and take-off breaker are housed in separate power boards and they are interconnected by distribution lines.

Accordingly, the installation area of the network receiving equipment is considerably increased only for the sake of installing the power boards and besides because of interconnections among the plurality of power boards, the wiring structure of distribution lines and network buses is complicated, making wiring work troublesome.

In addition, the separately installed network transformer, protector breaker and take-off breaker make it difficult to perform their maintenance/inspection. Conceivably, to cope with this problem, they may be stacked but in that case ease of push-in and pull-out working of the protector breaker and take-off breaker and ease of operation will be impaired. A power board disclosed in Japanese Utility Model Laid-open Publication Sho 56-100006 solves the problem of installation area but network buses disposed at a height raise a similar problem to the above.

SUMMARY OF THE INVENTION

An object of the present invention is to provide a power board capable of improving ease of operation and handling of the breakers.

Another object of the invention is to provide a power board capable of simplifying the arrangement construction of the bus and electrical apparatus to make the connection work easy.

Still another object of the invention is to provide a power board capable of considerably reducing the installation area of power receiving and transformer equipment.

A power board according to the invention comprises a transformer chamber formed in a lower portion of the power board, conduction chambers and electric chambers both formed in an upper portion of the power board, the electric chambers being on the front side of the power board, plural-phase transformers disposed in the transformer chamber with their longitudinal lengths lying in the horizontal direction, buses disposed horizontally in the conduction chambers corresponding to the horizontally disposed transformers, and breakers disposed in electric chambers corresponding to bus disposition portions corresponding to the horizontally disposed transformers.

Thus, the transformers are disposed horizontally in the transformer chamber with their longitudinal lengths lying in the horizontal direction to reduce their height dimensions considerably, the buses are disposed in the conduction chambers above the transformer chamber and the breakers are disposed in the electric chambers corresponding to the bus disposition portions, whereby the breakers are arranged within the range of height accessible by hand of the operator to permit him to manually pull out or push in the breakers in relation to the electric chambers or to manually operate the breakers, thus improving ease of operation and handling of the power board. Also, with the power board of the invention, the installation area of the power receiving and transform equipments can be reduced considerably.

DESCRIPTION OF THE PREFERRED EMBODIMENTS

A network power board according to an embodiment of the invention will now be described with reference to FIGS. 1 to 5.

Figure 1:
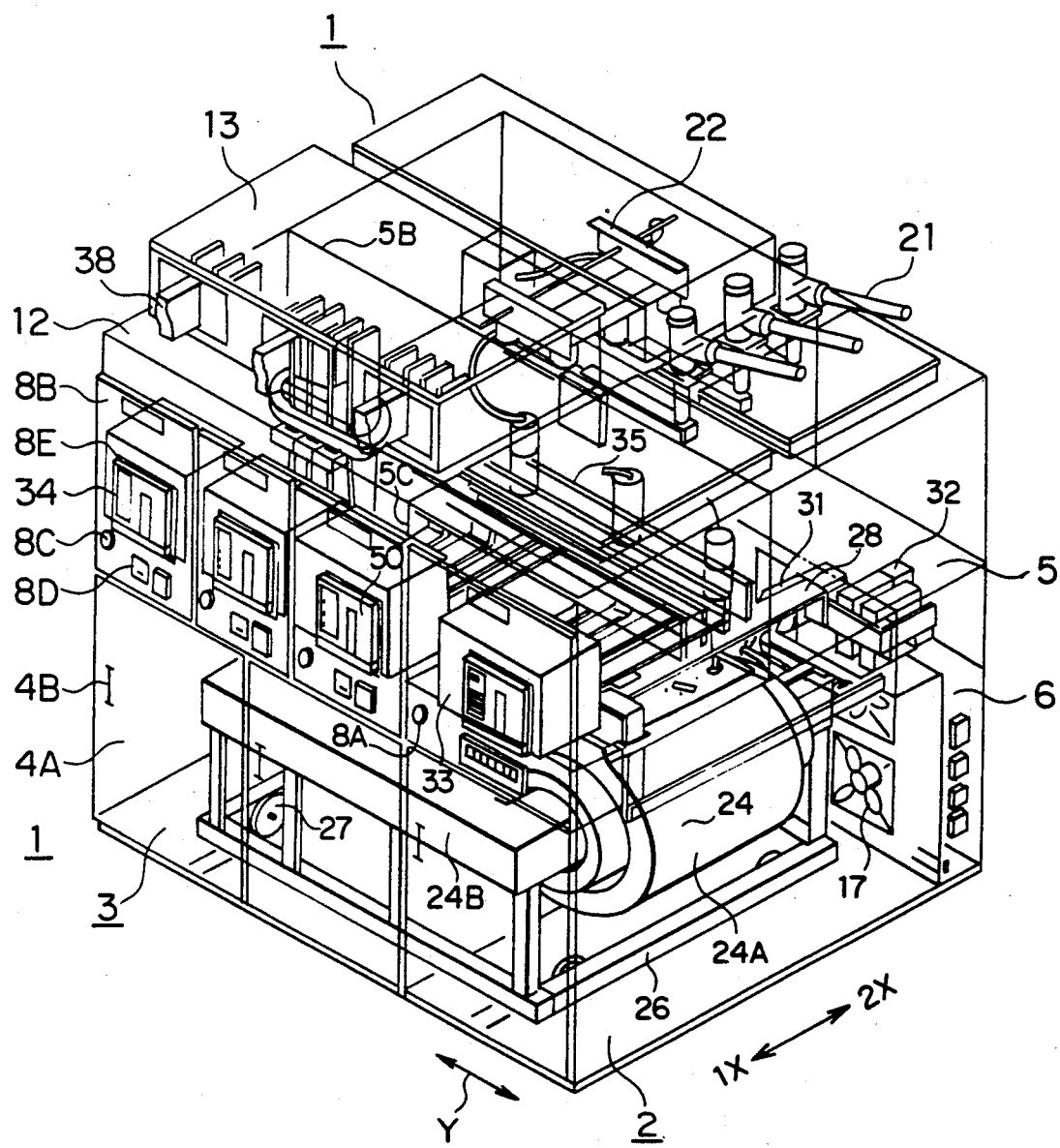
FIG. 1 is a perspective view of an embodiment of a network power board according to the present invention.
Figure 2:
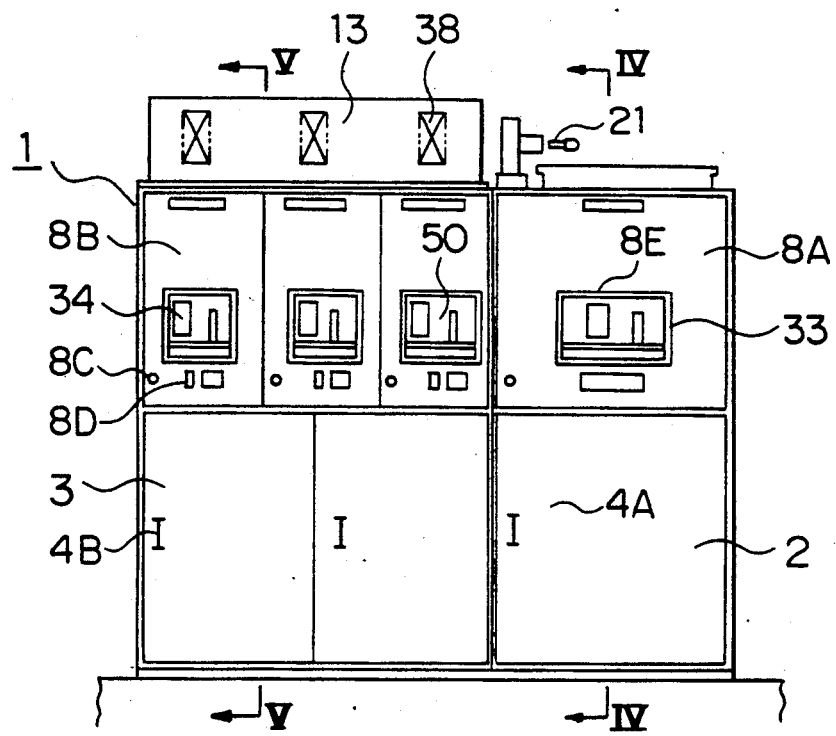
FIG. 2 is a front view of the FIG. 1 network power board.
Figure 3:
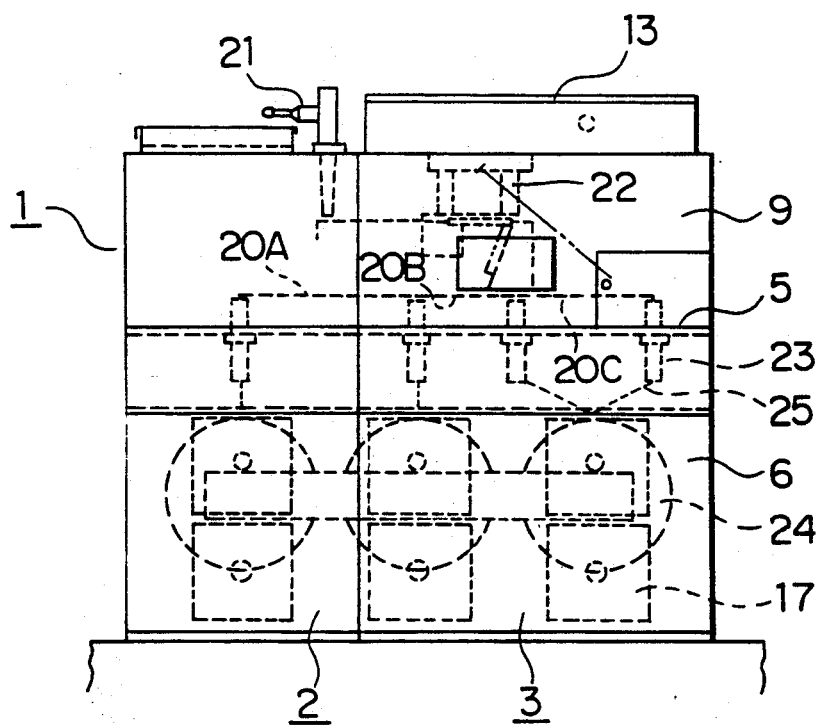
FIG. 3 is a back view of the FIG. 1 network power board.
Figure 4:
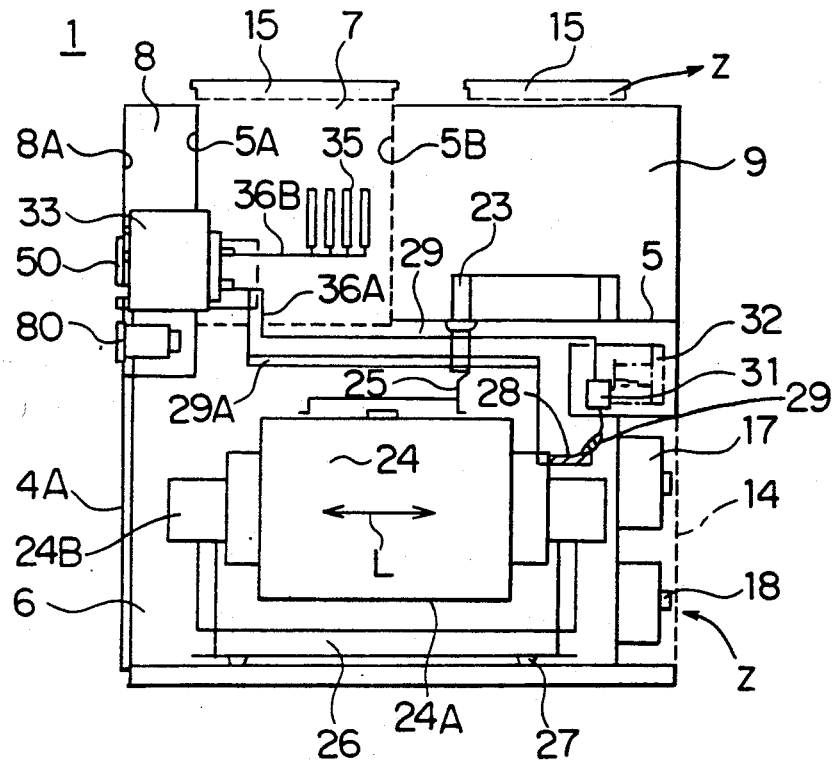
FIG. 4 is a sectional view taken on the line A—A in FIG. 2.
Figure 5:
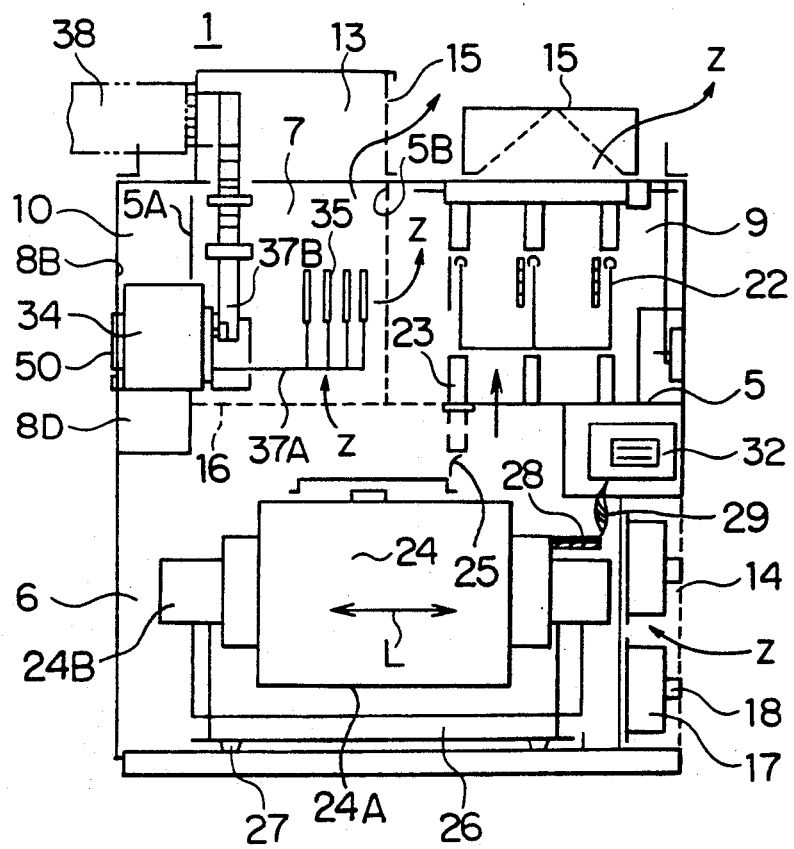
FIG. 5 is a sectional view taken on the line B—B in FIG. 2.

FIG. 1 is a perspective view for better understanding of the invention which has disagreement in some portions when compared with FIGS. 2 through 12. FIG. 2 is a front view of the FIG. 1 network power board as seen from left and FIG. 3 is a back view of the FIG. 1 network power board as seen from right, both the figures showing an embodiment of a network power board of the invention. In FIG. 3, for avoidance of complexity, only conductors operating at high voltage are illustrated. FIGS. 4 and 5 are sectional views taken on the line IV—IV and the line V—V, respectively, in FIG. 2.

Referring to these figures, the network power board, generally designated by reference numeral 1, is constructed to have the form of a box comprised of a first power board unit 2 and a second power board unit 3 both formed of steel plate. The two units 2 and 3 are separable. The interior of the network power board 1 is partitioned by an intermediate partition plate 5 made of, for example, steel. Formed under the partition plate 5 is a transformer chamber 6. The transformer chamber 6 has three doors 4A openably mounted to the network power board 1. Each door 4A is provided with a knob 4B. Above the partition plate 5, two partition plates 5A and 5B are provided at a predetermined spacing to form a conductor chamber 7, and an electric chamber 8 and a switch chamber 9 which are disposed on either side of the conductor chamber 7.

The electric chamber 8 and an electric chamber 10 are separated from each other by a partition plate 5C made of steel to form two independent chambers. The front of the electric chamber 8 is covered with a door 8A openably mounted to the network power board and the front of the electric chamber 10 is covered with three doors 8B also openably mounted to the network power board. The electric chamber 10 is divided into three independent chambers corresponding to the three doors 8B. Each of the doors 8A and 8B is provided with a knob 8C, a meter 8D and a square opening 8E. A roof surface 12 associated with the electric chamber 8 and switch chamber 9 is formed with a ventilation duct 13.

The electric chambers 8 and 10 and the switch chamber 9 are in communication with the ventilation duct 13. The back side, of the transformer chamber 6 is formed with intake openings 14 and the ventilation duct 13 is provided with exhaust openings 15. The switch chamber 9 is also provided with exhaust openings 15 as shown in FIGS. 4-5. The partition plate 5 is formed with a plurality of small holes 16. Accordingly, as shown by arrows Z, air drawn through the intake openings 14 passes through the plurality of small holes 16 and goes out of the apparatus through the exhaust openings 15. Blowers 17 disposed near the intake openings 14 are driven for rotation by motors 18.

Three-phase network power distribution lines 20A, 20B and 20C are connected to conductors of elbow type cable heads 21 as shown in FIG. 3. Each of the elbow type cable heads 21 is disposed inside the switch chamber 9, having one end passing through the ceiling and the other end being connected through a bus to a load switch 22 inside the switch chamber. One end of each load switch 22 is connected to a primary terminal 25 of a three-phase network transformer 24 inside the transformer chamber through a bushing 23 provided in the partition plate 5. In place of the load switch 22, a circuit breaker may be used. Network wiring 20 as representing the aforementioned power distribution lines 20A to 20C may alternatively be connected to the primary terminals 25 of the network transformers 24 through a lower portion of the network power board 1.

For example, a voltage of about 22000 V and a current of about 52A at the primary side of the network transformer 24 is converted into a voltage of about 415 V and a current of about 2800A at the secondary side. The network transformer 24 of each phase is a so-called horizontal disposition type network transformer which has its length in a longitudinal direction L lying in the horizontal direction. Three-phase coils 24A of the horizontal disposition type network transformers 24 are spaced at predetermined intervals in a width direction Y of the network power board 1. Each three-phase coil 24A is formed of a conductor wound on a core 24B. In an alternative, the length in a longitudinal direction L of the network transformer may be placed along the width direction Y of the network power board 1. The horizontally disposed network transformers 24 are supported on a carrier 26 which is movable in arrow directions 1X and 2X by the aid of wheels 27 mounted to the carrier 26. The 1X arrow direction is directed towards the front and the 2X arrow direction is directed towards the back.

A lead conductor 29 extending from a secondary terminal 28 of the horizontal disposition type network transformer 24 connects to a fuse 31 and a protector current transformer 32 at the back of the electric chamber 8 and again extends therefrom towards the front so as to connect to a primary side of a protector breaker 33. Denoted by 29A is a neutral conductor.

Figure 9:
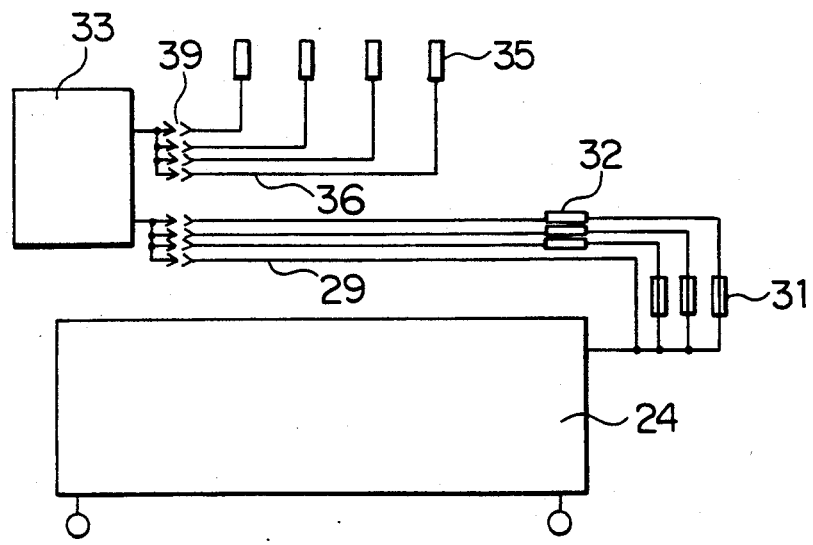
FIG. 9 is a diagram useful to explain an embodiment of wiring between the network transformer and the protector breaker.
Figure 10:
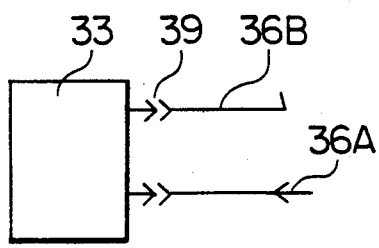
FIG. 10 is a connection diagram showing an embodiment of connection of the protector breaker used in the network power board of the invention.
Figure 11:
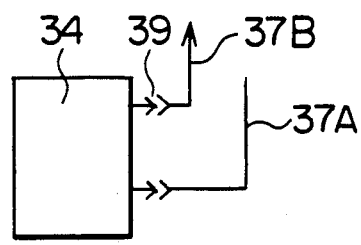
FIG. 11 is a connection diagram showing an embodiment of connection of the take-off breaker used in the network power board of the invention.

The protector breaker 33 is housed in the electric chamber 8 with the door 8A opened. The three doors 8B are disposed leftwardly of the door 8A and take-off breakers 34 are housed in the electric chamber 10 with the three doors 8B opened. The electric chambers 8 and 10 separated from each other by the partition plate 5C are independent. When the door 8A and the doors 8B are closed, the meters 50 provided on the protector breaker 33 and take-off breakers 34 jut out of the openings 8E, so that they are allowed to be operated externally. As the protector breaker 33 are pushed in or pulled out of the electric chamber 8 externally, the primary and secondary sides of the breaker 33 are electrically connected to or disconnected from a circuit breaker 39 provided in the electric chamber 8 as shown in FIGS. 9 to 11. Similarly, as the take-off breaker 34 is pushed in or pulled out of the electric chamber 10 externally, the primary and secondary sides of the breaker 34 are electrically connected to or disconnected from a circuit breaker 39 provided in the electric chamber 10. Lead conductors 36 representing conductors 36B and lead conductors 37 representing conductors 37B connected to the circuit breaker 39 are connected to network buses 35.

Figure 6:
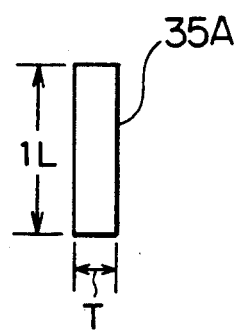
FIG. 6 is a side sectional view of a strip conductor used as a network bus.
Figure 7:
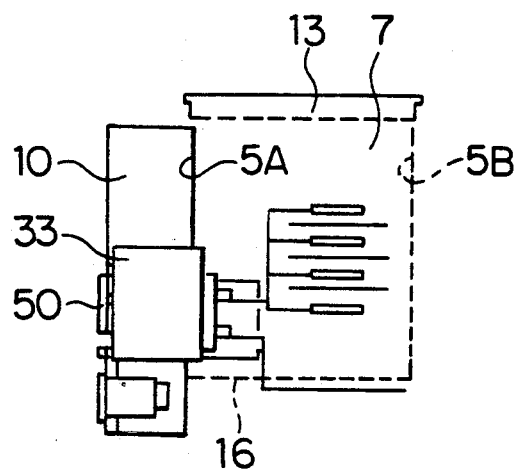
FIG. 7 is a partial sectional view showing a network power board according to another embodiment of the invention.

Referring in particular to FIGS. 4 and 5, plural-phase network buses 35 extending in the direction of juxtaposition (vertical to the sheet of drawing) of the plural-phase horizontal disposition type network transformers 24 are spaced at predetermined intervals in the longitudinal direction L of the network transformer 24, and the protector breaker 33 and the take-off breakers 34 are connected to the network buses 35. Used as each network bus 35 is a strip conductor 35A as shown in FIG. 6. In the example shown in FIGS. 4 and 5, the strip conductor is so disposed as to have a width 1L lying in the direction of height and a thickness T in a direction orthogonal to the height direction. In an alternative as shown in FIG. 7, however, the strip conductor 35A may be disposed such that a thickness 1L and a width T both lie in the direction orthogonal to the height direction of the strip conductor. In other words, plural-phase network buses 35 may be disposed stepwise in the vertical direction as shown in FIG. 7.

As will be seen from FIGS. 4 and 5, the protector breaker 33 and take-off breakers 34 are disposed in the direction of extension of the network buses 35, that is, vertically to the sheet of drawing. A plurality of secondary lead conductors 36B of the protector breaker 33 and a plurality of primary lead conductors 37A of each take-off breaker 34 are disposed in the direction of extension of the network buses 35. With the construction wherein the plurality of secondary lead conductors 36B of the protector breaker 33 and the plurality of primary lead conductors 37A of the take-off breaker 34 are connected to four phases of the network buses 34 and besides the lead position of secondary lead conductor 36B is higher than that of primary lead conductor 37A as shown in FIGS. 9 through 11, the meters 50 of the protector breakers 33 and take-off breakers 34 can be placed at the doors 8A and 8B so as to be aligned in the same direction. A plurality of secondary lead conductors 37B of each take-off breaker 34 extend upwards opposite to the network transformers 24 and connect to load conductors 38 inside the ventilation duct 13 which extend externally at the front of the network power board 1. The secondary lead conductors 37B may be disposed along the network buses 35.

Operation and effect of the network power board of the invention will now be described.

In the present embodiment, since the horizontal disposition type network transformers 24 are greatly decreased in a height dimension as compared to the vertical type transformers in which the longitudinal length of transformer is disposed vertically, the network buses 35 are arranged above the transformers 24 and the protector breaker 33 and take-off breakers 34 are disposed on one side of the network buses 35 within the range of height accessible by hand of the operator. Therefore, the operator can manually pull out or push in the protector breaker 33 in relation to the electric chamber 8 and the take-off breakers 34 in relation to the electric chamber 10 or operate the meters 8D and 50, thus improving ease of operation and handling of the protector breaker 33, take-off breakers 34 and electric chambers 8 and 10.

In order to ensure the range of height accessible by hand of the operator, the protector breaker 33 and take-off breakers 34 may be disposed above the horizontal disposition type network transformers 24 supported by the carrier 26 within the dimensional range which is the sum of the height of the transformers 24 and the diameter of the network transformer coil 24A. Below this dimensional range, the disposition of the network transformers 24 prevents the protector breaker 33 and take-off breakers 34 from being disposed. Above the dimensional range, the electrical apparatus such as the protector breaker 33 and take-off breakers 34 are inaccessible by hand of the operator to impair ease of operation by the operator.

The fuse 31 and protector current transformer 32 are also disposed within the range of height accessible by hand of the operator, obviously attaining similar operation and effect to those described above. Further, the concentrated disposition of the fuse 31 and protector current transformer 32 at the back of the network power board 1 ensures easy operations of mounting and maintenance/inspection and improved appearance of the door and front.

Figure 8:
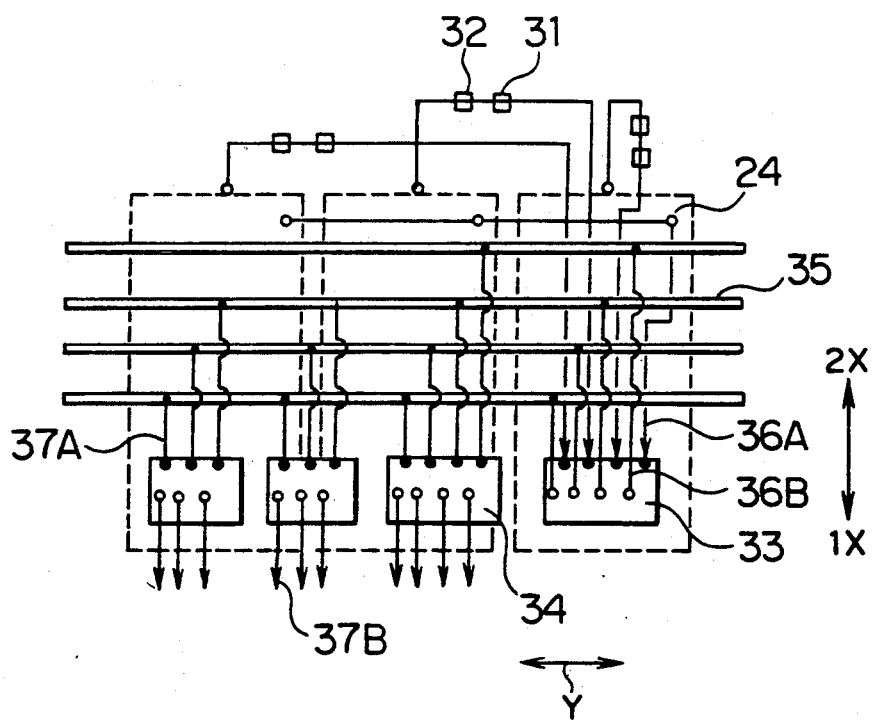
FIG. 8 is a schematic circuit diagram showing a network power board circuit in the embodiment of FIGS. 1 to 5.

In the present embodiment, since the secondary lead conductors 37B of the take-off breakers 24 are led towards the roof surface, the correspondingly disposed network buses 35 as well as the secondary lead conductors 36B of protector breaker 33 and the primary lead conductors 37A of take-off breakers 34, having different lead positions, can all be arranged linearly above the transformer chamber and in addition these lead conductors can be connected directly to the network buses as shown in FIG. 8, thus simplifying the conductor arrangement. Further, the primary and secondary lead conductors 37A and 36B are led at different positions to make clear distinction between the primary and secondary lead conductors, thereby minimizing errors in wiring. In particular, the positions of the protector breaker 33 and take-off breakers 34 can be discriminated immediately even in the dark interior of the network power board 1 and as a result, operations of assembling and maintenance/inspection can be carried out very easily and errors in wiring can be minimized.

In the present embodiment, the secondary lead conductors 37B of the take-off breakers 34 are led upwards opposite to the network transformers 24 and hence their insulation from the network transformers 24 can be sufficient to ensure electrical safety.

Further, since the secondary lead conductors 37B of the take-off breaker 34 extend upwards opposite to the network transformer 24 to connect to the lead conductors 38 inside the ventilation duct 38 as shown in FIGS. 5 and 11, the secondary lead conductors 37B and load conductors 38 do not come into collision with the network bus 35 and network transformer 24 and so without suffering from insulation problem, they can extend externally from the front of the network power board 1 with electrical safety, thereby ensuring that the network buses 35 can be extended linearly with safety.

Figure 12:
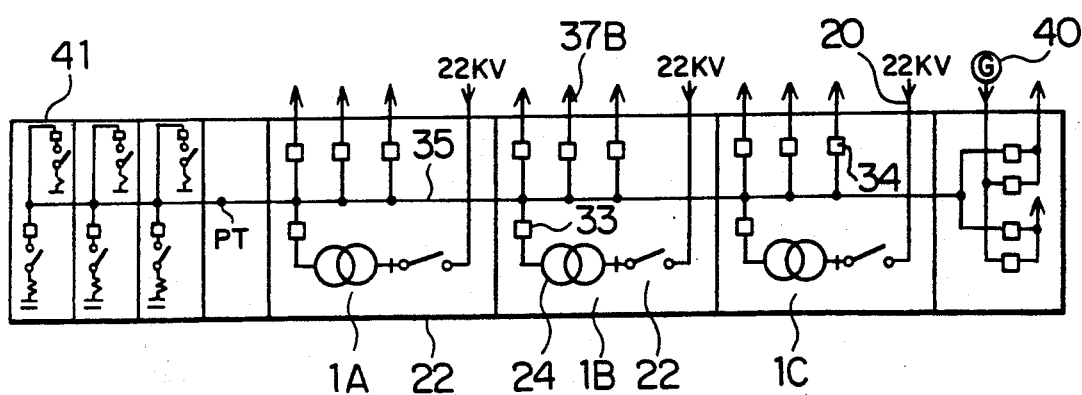
FIG. 12 is a schematic circuit diagram showing an embodiment of a network receiving and transformer system of the invention.

Accordingly, as shown in FIG. 12, a linear network bus 35 can be so laid as to be connected to network power boards 1A, 1B and 1C of a 22 kV three-circuit circuit network circuit and to a private generator 40 and a power factor capacitor 41 which are adjacent to the network power boards, to form a network receiving and transformer system in which electrical apparatus such as, for example, private generator 40 and power factor capacitor 41 can be concentrated to the network bus 35 so that the installation area of the network receiving and transformer system may further be reduced considerably and the power distribution system may be simplified.

Also protector breaker 33 and take-off breakers 33 and 34 can be disposed in the direction of disposition of plural-phase network transformer 24 and network bus 35 and therefore the plural-phase network transformer 24, protector breaker 33, and take-off breakers 34 and the network bus 35 can be concentrated at one location, ensuring that the installation area of the network receiving system can be reduced considerably and the plural-phase network transformer 24, protector breaker 33, and take-off breakers 34 can be subjected to maintenance/inspection at one location to make the maintenance/inspection operation very easy.

Furthermore, terminals and lead conductors of plural-phase network transformer 24, protector breaker 33, and take-off breakers 34 are disposed at locations orthogonal to the network bus 35 and they do not cross the bus 35 electrically, with the result that generation of magnetic force can be prevented and adverse influence upon the electrical apparatus can be avoided.

In a modified embodiment of the foregoing embodiment, a transformer chamber 6 is formed in an upper portion of a network power board 1 with conductor chambers 7 and electric chambers 8 and 10 formed in a lower portion of the power board 1, and horizontal disposition type network transformers 24 are housed in the transformer chamber 6, network buses 35 are laid in the conductor chambers 7 and a protector breaker 33 and take-off breakers 34 are housed in the electric chambers 8 and 10. The network buses 35, protector breaker 33 and take-off breakers 34 are disposed corresponding to the horizontal disposition type network transformers 24.

In this modification, primary terminals 36A and 37A of the protector breaker 33 and take-off breaker 34 are disposed above secondary terminals 36B and 37B to prevent the primary terminal 36A of the protector breaker 33 from electrically crossing the secondary terminal 37B and at the same time the load side lead conductor connected to the secondary terminal 37B of the take-off breaker 34 may be laid on the floor opposite to the network transformer 24 so as to be led externally or may be laid along the floor or network bus 35 so as to be led externally.

In the foregoing embodiment, the network power board 1 is divided into the first power board unit 2 having the protector breaker 33 and the second power board unit 3 having the take-off breakers 34. Therefore, for a network receiving the transform system of increased electrical capacity, the network transformers 24 and protector breaker 33 are used which are increased in electrical capacity. In order to enable the first power board unit 2 to accommodate the network transformers 24 and protector breakers 33 having larger electrical capacity than that of the ordinary network transformers and protector breakers, a plurality of standardized first power board units 2 are used in combination in accordance with the electrical capacity demanded. Similarly, as the second power board unit 3, a plurality of standardized second power board units 3 may be used in combination. Thus, the network power board 1 can be assembled by using a plurality of standardized power board units in combination in accordance with demanded electrical capacity to improve efficiency of assemblage working.

In the foregoing embodiment, the motor 18 may be driven by closing a switch not shown when a secondary current of network transformer 24 exceeding a predetermined value is detected by means of the current transformer 31 or may be driven by the action of a thermostat which is mounted in the transformer and actuatable when temperature in the transformer exceeds a predetermined value. When the motors 18 are driven to rotate the blowers 17, external air is passed in the directions of arrows Z to lower temperatures in individual chambers. The temperature decrease permits the network transformers 24, protector breaker 33 and take-off breakers 34 to operate at current which approximate the limit of rated currents.

The embodiments of the invention have been described by way of the network power board but the invention may be practiced in a power board using transformers. In this type of power board in which power is received from an external power supply and stepped down so as to be supplied to a plurality of loads, plural-phase transformers are disposed horizontally in a lower portion of the power board, buses are disposed in an upper portion of the power board and breakers are placed in electric chambers at the front of the power board which correspond to the buses in the upper portion of the power board.

Figure 13:
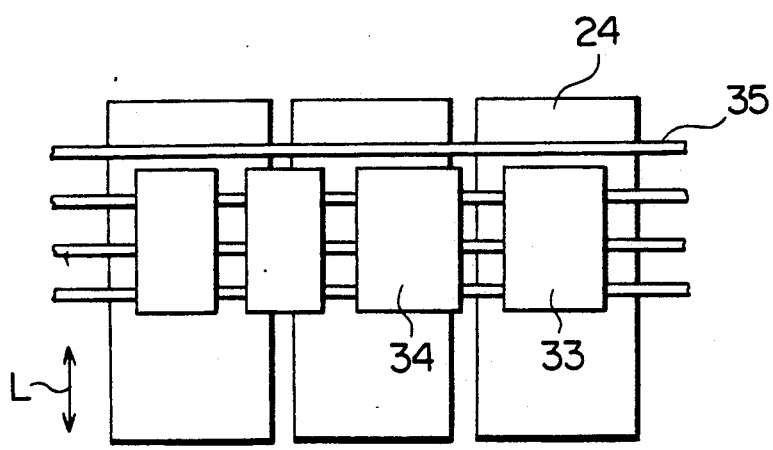
FIG. 13 is a schematic diagram showing a power board according to still another embodiment of the invention.
Figure 14:
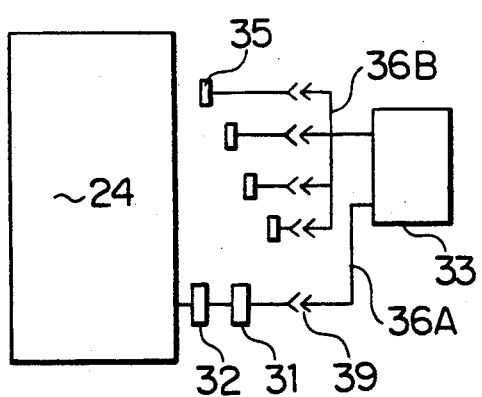
FIGS. 14 and 15 are side sectional views schematically showing the protector breaker and the take-off breaker, respectively, used in the FIG. 13 embodiment.
Figure 15:
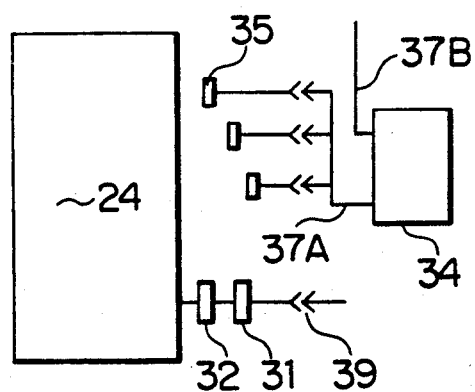

Referring to FIGS. 13 to 15, a power board according to another embodiment of the invention will now be described. In this embodiment, transformers 24 are disposed behind buses 35 and a protector breaker 33 and take-off breakers 34 are disposed before the buses 35. The longitudinal direction L of the transformer 24 is set upright and the bus 35 is arranged in association with the vertical surface of the transformer. The primary side of the transformer 24 is connected to the protector breaker 33. The secondary side of the protector breaker 33 and the primary side of the take-off breaker 34 are connected to the buses 35. The plural-phase buses 35 are arranged to take the form of stairs or vertically in order to considerably reduce the installation area between the transformers 24 and the both types of breakers 33 and 34 and these breakers 33 and 34 are disposed in correspondence relationship with the buses 35 to allow the operator to handle the breakers 33 and 34 directly. The secondary side, 37B, of take-off breaker 34 connected to the load conductor extends upwards to ensure safety.

As has been described, according to the invention, the network transformers having their longitudinal lengths disposed horizontally to take the form of a so-called horizontal disposition type network transformer are decreased in height. The network buses are arranged above the network transformers and the protector breaker and take-off breakers are disposed in the electric chambers at the front of the power board which correspond to the network buses, whereby the both types of breakers can be disposed within the range of height accessible by hand of the operator to permit the operator to manually handle the protector breaker, take-off breakers and meters of electric chambers, thus improving ease of operation of the protector breaker, take-off breakers and eventually power board. Further, the load side lead conductor of the take-off breaker extends opposite to the network transformer and consequently lead conductors of the breakers can be laid linearly to connect to the network buses, thus simplifying the conductor arrangement.

I claim:

1. A network power board comprising:
   means for defining a transformer chamber, a first electric chamber, a second electric chamber, and a conductor chamber, wherein the first electric chamber, the second electric chamber, and the conductor chamber are above the transformer chamber, wherein the first electric chamber and the second electric chamber adjoin each other in a horizontal direction at a front side of the network power board where the network power board is to be operated by an operator, and wherein the conductor chamber is behind the first electric chamber and the second electric chamber relative to the front side of the network power board;

a plural-phase network transformer having a longitudinal axis and a plurality of secondary terminals, the transformer being disposed in the transformer chamber such that the longitudinal axis of the transformer is horizontally disposed;

a protector breaker disposed in the first electric chamber and having a plurality of primary terminals and a plurality of secondary terminals;

a take-off breaker disposed in the second electric chamber and having a plurality of primary terminals and a plurality of secondary terminals;

a plural-phase network bus disposed in the conductor chamber and having a plurality of phase conductors;

a plurality of first lead conductors respectively connecting the primary terminals of the protector breaker to the secondary terminals of the transformer;

a plurality of second lead conductors respectively connecting the secondary terminals of the protector breaker to the phase conductors of the network bus at respective first locations;

a plurality of third lead conductors respectively connecting the primary terminals of the take-off breaker to the phase conductors of the network bus at respective second locations different from the first locations; and a plurality of fourth lead conductors respectively connected to the secondary terminals of the take-off breaker and extending away from the transformer for connection to a load to be served by the network power board.

2. A network power board comprising:

means for defining a transformer chamber and at least one other chamber, the at least one other chamber being above the transformer chamber;

a transformer having a longitudinal axis and a secondary terminal, the transformer being disposed in the transformer chamber such that the longitudinal axis of the transformer is horizontally disposed;

a protector breaker disposed in the at least one other chamber and having a primary terminal and a secondary terminal;

a take-off breaker disposed in the at least one other chamber and having a primary terminal and a secondary terminal;

a network bus disposed in the at least one other chamber and having a phase conductor;

a first lead conductor connecting the primary terminal of the protector breaker to the secondary terminal of the transformer;

a second lead conductor connecting the secondary terminal of the protector breaker to the phase conductor of the network bus;

a third lead conductor connecting the primary terminal of the take-off breaker to the phase conductor of the network bus; and a fourth lead conductor connected to the secondary terminal of the take-off breaker for connection to a load to be served by the network power board.

3. A network power board according to claim 2, wherein the fourth lead conductor extends in a vertical direction such that the fourth conductor does not intersect a vertical plane extending along the network bus.

4. A network power board comprising:

a transformer having a secondary terminal;

a protector breaker having a primary terminal and a secondary terminal;

a take-off breaker having a primary terminal and a secondary terminal, the secondary terminal being disposed above the primary terminal;

a network bus having a phase conductor;

a first lead conductor connecting the primary terminal of the protector breaker to the secondary terminal of the transformer;

a second lead conductor connecting the secondary terminal of the protector breaker to the phase conductor of the network bus;

a third lead conductor connecting the primary terminal of the take-off breaker to the phase conductor of the network bus; and a fourth lead conductor connected to the secondary terminal of the take-off breaker for connection to a load to be served by the network power board, the fourth lead conductor extending in a vertical direction such that the fourth conductor does not intersect a vertical plane extending along the network bus.

5. A network power apparatus comprising:

at least one network power board;

a generator unit;

a power factor capacitor unit; and a network bus having a phase conductor;

wherein the at least one network power board, the generator unit, and the power factor capacitor unit are disposed in a row extending in a horizontal direction;

wherein the network bus extends in the horizontal direction one of (1) through the at least one network power board, the generator unit, and the power factor capacitor unit and (2) behind the at least one network power board, the generator unit, and the power factor capacitor unit relative to front sides of the at least one network power board, the generator unit, and the power factor capacitor unit;

wherein the generator unit and the power factor capacitor unit are connected to the phase conductor of the network bus; and wherein each of the at least one network power board includes:

means for defining a transformer camber and at least one other chamber, the at least one other chamber being above the transformer chamber, a transformer having a longitudinal axis and a secondary terminal, the transformer being disposed in the transformer chamber such that the longitudinal axis of the transformer is horizontally disposed, a protector breaker disposed in the at least one other chamber and having a primary terminal and a secondary terminal, a take-off breaker disposed in the at least one other chamber and having a primary terminal and a secondary terminal, a first lead conductor connecting the primary terminal of the protector breaker to the secondary terminal of the transformer, a second lead conductor connecting the secondary terminal of the protector breaker to the phase conductor of the network bus, a third lead conductor connecting the primary terminal of the take-off breaker to the phase conductor of the network bus, and a fourth lead conductor connected to the secondary terminal of the take-off breaker for connection to a load to be served by the network power board.

6. A network power board comprising:

means for defining a transformer chamber, a first electric chamber, a second electric chamber, and a conductor chamber, wherein the first electric chamber, the second electric chamber, and the conductor chamber are above the transformer chamber, wherein the first electric chamber and the second electric chamber adjoin each other in a horizontal direction at a front side of the network power board where the network power board is to be operated by an operator, and wherein the conductor chamber is behind the first electric chamber and the second electric chamber relative to the front side of the network power board;

a transformer having a longitudinal axis and a secondary terminal, the transformer being disposed in the transformer chamber such that the longitudinal axis of the transformer is horizontally disposed;

a protector breaker disposed in the first electric chamber and having a primary terminal and a secondary terminal;

a take-off breaker disposed in the second electric chamber and having a primary terminal and a secondary terminal;

a network bus disposed in the conductor chamber and having a phase conductor;

a first lead conductor connecting the primary terminal of the protector breaker to the secondary terminal of the transformer;

a second lead conductor connecting the secondary terminal of the protector breaker to the phase conductor of the network bus;

a third lead conductor connecting the primary terminal of the take-off breaker to the phase conductor of the network bus; and a fourth lead conductor connected to the secondary terminal of the take-off breaker for connection to a load to be served by the network power board.

* * * * *